Dec. 3, 1963
L. S. SUOZZO ETAL
3,112,909
SUPPORT APPARATUS FOR PIPING AND THE LIKE
Filed Dec. 26, 1961
2 Sheets-Sheet 1
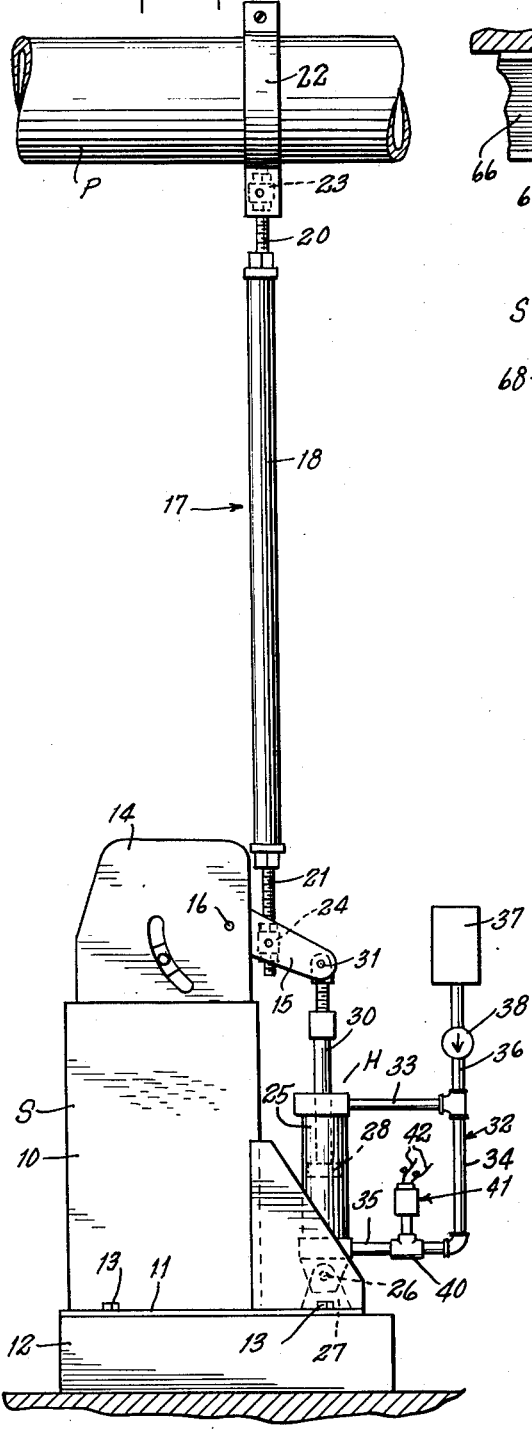
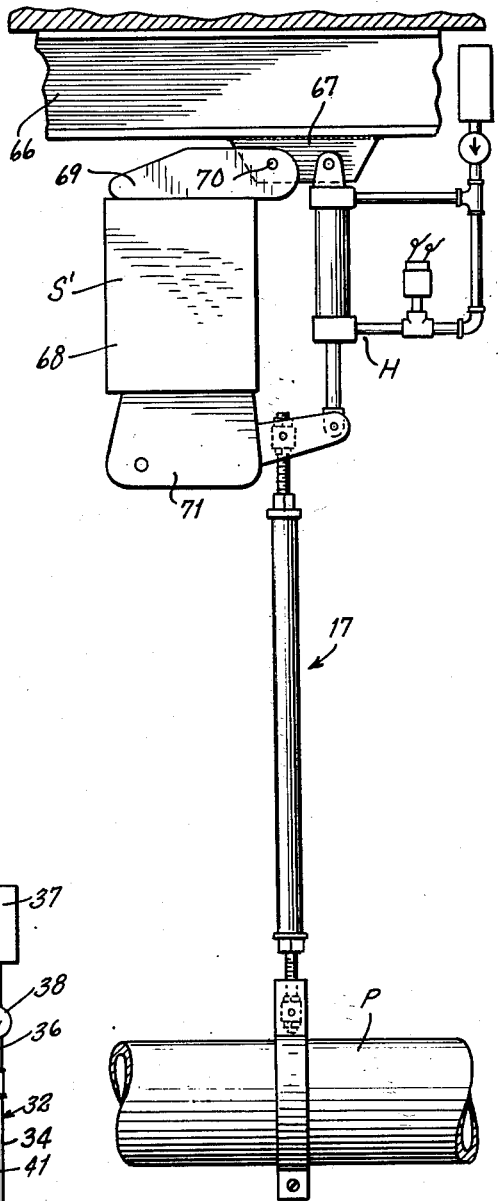
INVENTORS
LEONARD S. SUOZZO
MICHAEL L. MANCINI
BY
*J. J. Pizarra*
ATTORNEY

United States Patent Office 3,112,909
Patented Dec. 3, 1963

3,112,909
SUPPORT APPARATUS FOR PIPING AND THE LIKE

Leonard S. Suozzo, Hackensack, and Michael L. Mancini, Glen Rock, N.J., assignors to Bergen Pipesupport Corp., New York, N.Y., a corporation of New York
Filed Dec. 26, 1961, Ser. No. 162,047
15 Claims. (Cl. 248—58)

This invention relates to the art of supports and, more particularly, to support apparatus for supporting and restraining a load, such as piping or the like, against shock forces to which it may be subjected in use.

While the apparatus of this invention is adapted to be advantageously employed with various types of loads it is especially useful to afford requisite shock restraint to piping loads in the category of those which are presently utilized in power plants, oil refineries and a variety of chemical plants to transmit high temperature and high pressure fluids from one location to another. Accordingly, the ensuing discussion and the detailed description that follows will be directed primarily to application of the invention to piping loads, by way of illustration.

It is not uncommon in modern power plants to employ metal piping systems to transmit steam at temperatures in excess of 750° F. and at pressures greater than 1500 pounds per square inch. Such systems require adequate support to permit and compensate for movement of the piping due to normal expansion and contraction of the metal thereof. Considerable study and research have been devoted in fairly recent years to the problem of providing practical and dependable spring devices for imparting substantially constant supporting forces to piping loads of the character indicated. This study and research has resulted in several outstanding improvements in the field of constant spring support devices. These improvements are exemplified by the structures disclosed in L. S. Suozzo United States Patent Nos. 2,923,507, granted February 2, 1960, and 2,939,663, granted June 7, 1960.

In addition to providing proper and adequate spring support devices to permit a piping load to float freely under normal conditions of use, it is important to also provide restraint apparatus to resist shock forces which may be created by unusual conditions of use, whereby to protect the piping and associated equipment against damage. Shock forces to which the piping may be subjected are classified in two categories, namely: (1) shock forces of relatively long duration and (2) shock forces of relatively short duration. An example of a shock force of long duration is the reaction force resulting from the operation of a pressure relief valve which communicates with the piping load. An example of a shock force of relatively short duration is a seismic or an impact disturbance which creates objectionable vibrations in the piping.

Accordingly, the present invention pertains to support apparatus for supporting and restraining a piping load or the like against shock forces to which it may be subjected. To this end, the apparatus of the invention contemplates supporting means comprising a hydraulic unit which includes a cylinder containing a supply of a substantially incompressible fluid, a piston reciprocable in the cylinder, a piston rod connected to the piston and extending through and beyond an end of the cylinder, a conduit establishing communication between opposite end portions of the interior of the cylinder, and a normally open valve connected to the conduit for controlling fluid flow through the conduit. A load-carrying means is operatively connected at one end to the supporting means and is adapted to be connected at its other end to a load, such as piping. The apparatus also comprises a mechanism or means responsive to variations in a condition of the load for operating the valve. This mechanism preferably comprises an electric circuit including a solenoid which is connected to the valve, a normally open switch in series with the solenoid and means responsive to variations in a condition of the load for closing the switch and energizing the solenoid. Energization if the solenoid operates the valve from open position to closed position, thereby interrupting flow of the hydraulic fluid. As a consequence, the piston, piston rod and load-carrying means become, in effect, a rigid supporting structure which restrains the load against shock or other forces until the condition of the load changes to an extent which causes the switch to be actuated from closed to open position. When the switch has returned to open position, the solenoid is denergized and causes the valve to reopen and the parts of the hydraulic unit to again function in a normal manner.

The referred-to mechanism is so constructed and arranged as to respond to variations in a selected condition of the piping, such as (a) variations in the pressure of fluid transmitted through the piping, (b) variations in the temperature of the fluid in the piping, (c) variations in the position of an element carried by the piping and (d) variations in the force exerted by the piping on the supporting means. As will be evident to persons trained in the art, the mechanism may be readily designed so as to be responsive to variations in two or more of the above-mentioned conditions or other conditions of the piping.

The supporting means of the apparatus preferably comprises a spring support device and a hydraulic unit, especially when the apparatus is intended for use with a piping system. The support device may consist of any suitable known device, such as one of the constant support devices disclosed in said L. S. Suozzo patents. It should be borne in mind, however, that a spring support device may be omitted from the apparatus of this invention. It will be apparent to persons trained in the art that whether or not a spring support device is included as a component of the apparatus depends on various factors including the specific load, particular conditions of use and manner of normally supporting the load.

The primary object of this invention is to provide improved apparatus for supporting and restraining a load against shock forces to which it may be subjected in use.

Another object of the invention is to provide apparatus for supporting and restraining a load, such as piping against shock forces and including a hydraulic unit, load-carrying means operatively connected to the hydraulic unit and adapted to be connected to the load, and electro-mechanical means responsive to variations in a condition of the load for controlling operation of the hydraulic unit.

A further object of the invention is to provide apparatus of the character indicated that is simple, sturdy and durable in design and construction; that is reasonable in manufacturing, installation and maintenance costs; and that is capable of performing its intended functions in an efficient and dependable manner.

The enumerated objects and other objects, together with the advantages of the invention, will be readily understood by persons trained in the art from the following detailed description and the accompanying drawings which describe and illustrate several forms of construction embodying the invention.

In the drawings, wherein like reference characters denote corresponding parts in the several views:

FIG. 1 is a view in elevation of an arrangement of apparatus according to this invention for supporting an overhead piping load;

Figure 2:
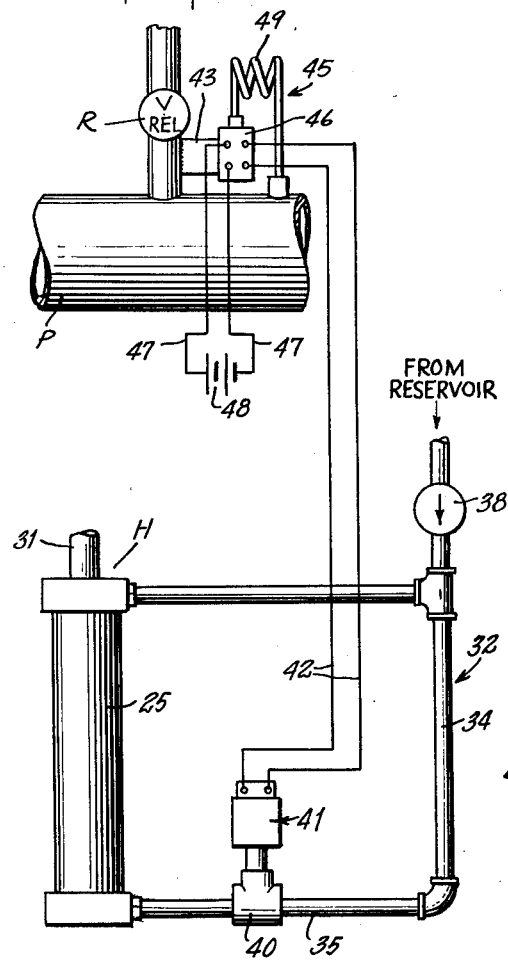
FIG. 2 is an elevation view illustrating certain parts of the apparatus of FIG. 1, on an enlarged scale, operatively associated with a preferred form of control means.
Figure 3:
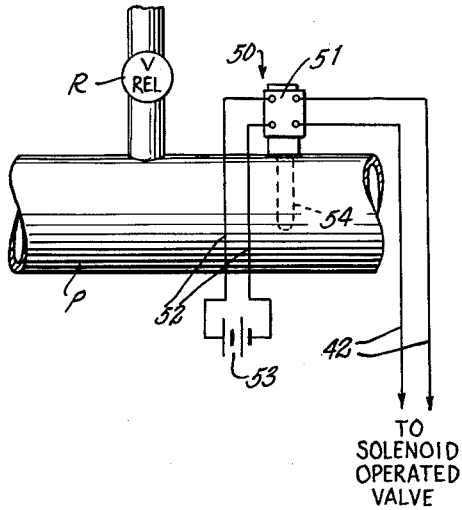
Figure 4:
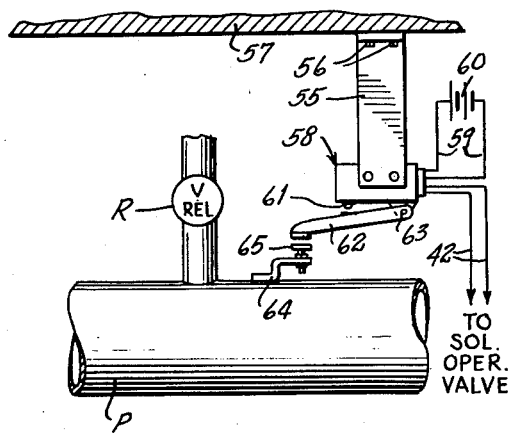

FIG. 3 corresponds to a portion of FIG. 2 and illustrates another form of control means;

FIG. 4 also corresponds to a portion of FIG. 2 and illustrates still another form of control means; and FIG. 5 corresponds to FIG. 1 and illustrates an arrangement of apparatus of this invention for supporting a suspended piping load.

Referring initially to FIG. 1 of the drawings, we have illustrated therein supporting means consisting of a spring support device S and a hydraulic unit H.

Spring support device S may be of the type disclosed in said L. S. Suozzo Patent No. 2,923,507. This device includes a cylindrical housing 10 which is provided with a bottom flange 11 that is mounted on and is secured to a concrete base block or pad 12 by screws or the like 13. Affixed to and projecting upwardly from housing 10 is a pair of spaced plates 14. A lever 15 is pivotally connected to plates 14, as indicated at 16. Lever 15 cooperates with parts positioned within housing 10 to impart a constant supporting force to a load in the manner disclosed in the above-mentioned patent to which reference may be had for details of construction and operation.

In the form of the invention shown in FIG. 1, device S is illustrated as supporting an overhead piping load, which is generally designated by the letter P, through the medium of an adjustable load-carrying means 17. This means comprises a rigid unit which includes a rectilinear tubular member 18 having a threaded first rod 20 at its upper end and a threaded second rod 21 at its lower end. Rod 20 is connected to a strap 22, which encircles piping P, by means of a universal joint 23. Rod 21 is similarly connected to lever 15 by a like universal joint 24. The provision of universal joints 23 and 24 permits requisite vertical and lateral movement of the piping load in use, without adversely affecting the operability or utility of the apparatus. If desired, a simple pivot may be substituted for either of the universal joints. Load-carrying means 17 has its parts so constructed and arranged that its effective length may be readily adjusted, as required by condition of use.

Hydraulic unit H is positioned adjacent spring support device S and includes an upstanding cylinder 25. The lower end of cylinder is pivotally connected, as indicated at 26, to a bracket 27 which is secured to base block 12. The hydraulic unit also includes a piston 28, which is reciprocable in cylinder 25, and a piston rod 30, which is affixed to the piston and extends through the upper end of the cylinder. The free end of the piston rod is pivotally connected to the free end of lever 15, as indicated at 31. Piston 28 may be provided with a conventional bleeder passage (not shown) and the parts are so constructed and arranged as to compensate for fluid displacement within the cylinder, as required by the volume occupied by the portion of the piston rod which is within the cylinder at a particular time.

A conduit 32 establishes communication between the portion of the cylinder above the piston and the portion of the cylinder below the piston. This conduit includes pipe sections 33, 34 and 35. Pipe section 34 has an extension 36 which communicates with a reservoir 37 that contains a supply of hydraulic fluid employed with the apparatus. The hydraulic fluid may consist of any suitable liquid or mixture of liquids known to the art. Pipe section 36 is provided with a check valve 38 which permits flow of the hydraulic fluid from reservoir 37 into pipe section 36 and thence into pipe sections 33 and 34, but prevents flow of the hydraulic fluid in a reverse direction.

Interposed in pipe section 35 is a valve 40 for controlling flow of the hydraulic fluid into and out of the lower end of the cylinder. This valve is connected to and operated by an electrical means which preferably consists of a solenoid unit that is generally denoted by numeral 41. The solenoid unit includes a pair of electric leads 42. Valve 40 is normally open, i.e. it normally permits flow of the hydraulic fluid in either direction through piping section 35 when the solenoid unit is de-energized. When the solenoid unit is energized, it operates valve 40 to close the same whereby to prevent further flow of the hydraulic fluid into or out of the lower end of cylinder 25 by way of pipe section 35.

Reference is next had to FIG. 2 which illustrates an arrangement of devices for controlling operation of solenoid unit 41 and, therefore, valve 40 in response to the pressure of fluid transmitted through piping load P. In this connection, there is provided a pressure relief valve R which is mounted on and communicates with piping load P. The relief valve carries a bracket 43. Secured to this bracket 43 is a mechanism 45. This mechanism includes a unit 46 which is secured to bracket 43 and which contains a pressure responsive switch (not shown). The switch is normally open and is connected to the solenoid unit by earlier-mentioned electric leads 42. Unit 46 is connected by a second pair of electric leads 47 to a suitable source of electric energy supply 48. A conduit 49 establishes communication between the interior of unit 46 and piping P. This conduit is preferably coiled, as shown in the drawing, and is made of a metal having high heat exchange characteristics whereby the temperature of fluid transmitted thereby from piping P into unit 46 will be maintained sufficiently low within unit 46 to avoid damaging the parts which are positioned therein.

For the purpose of outlining the operation of the above-described form of the invention, it is first assumed that the apparatus is assembled and that the parts are operatively connected, as shown in those views. It is also assumed that the electric switch in unit 46 is open and that solenoid 41 is de-energized and valve 40 is in open position. With the parts in the indicated relative position and condition, the hydraulic fluid is free to flow to opposite sides of piston 28 by way of conduit 32. Also spring support device S functions in its normal manner to afford a constant supporting force to piping P through load-carrying means 17.

Unit 46 is adapted to respond to predetermined variations in the pressure of the fluid transmitted through piping P. Also relief valve R is normally closed and adapted to open and relieve the pressure within the piping when the fluid in the piping attains a predetermined pressure. When the relief valve opens or "blows," it frequently creates a substantial reaction force, which may result in damage to the piping and/or associated equipment unless the piping is effectively restrained. Assuming that the relief valve is designed to open at a pressure of 1500 pounds per square inch, unit 46 is adjusted to close the switch therein when the pressure in piping P reaches a pressure slightly below 1500 pounds per square inch, such as 1490 pounds per square inch. Accordingly, when the pressure of the fluid in the piping attains the last-mentioned pressure, the switch in unit 46 is automatically closed. This completes the electric circuit and causes solenoid 41 to be energized and valve 40 to be operated to closed position. When this valve is closed, it prevents flow of the hydraulic fluid into either end of the cylinder. As a consequence, hydraulic unit H and associated parts serve as a rigid support and effectively restrain the piping against movement due to the reaction force that is created when the pressure of fluid in the piping opens the relief valve.

The switch remains closed so long as the fluid pressure in the piping is at or above the preselected pressure, such as 1490 pounds per square inch. When the fluid pressure drops below this value, the switch in unit 46 opens automatically. This causes the solenoid to be de-energized and valve 40 to be reopened.

FIG. 3 corresponds to a portion of FIG. 2 and illustrates an arrangement of devices for controlling operation of solenoid unit 41 and, therefore, valve 40 in response to the temperature of the fluid transmitted through piping load P. This form of the invention utilizes a temperature responsive mechanism 50, which includes a unit 51 that is mounted on the piping load, as shown. Unit 51 contains a normally open electric switch (not shown) which is connected to the solenoid unit by earlier-mentioned electric leads 42. Unit 51 is connected by a second pair of electric leads 52 to a suitable source of electric energy supply 53. A thermostat element 54 is coupled to the switch and projects into the interior of piping P where it is subjected and responds to the temperature of the fluid passing through the piping. Mechanism 50 may be of any desired known construction. It is believed sufficient for the purposes of this application to state that element 54 effects closing of the switch in unit 51 when the fluid in piping P attains a predetermined temperature. This completes the electric circuit to solenoid unit 41, whereby the solenoid unit is energized and valve 40 is automatically operated to closed position.

The operation of the modification of the invention shown in FIG. 3 is similar to that shown in FIGS. 1 and 2. The principal difference resides in the fact that the control means of FIG. 3 operates in response to temperature variations instead of pressure variations, as in the cast of FIG. 2.

FIG. 4 also corresponds to FIG. 2 and illustrates another modification of the invention. In this modification, operation of solenoid unit 41 and, therefore, valve 40 is controlled by movement or change in the vertical position of the piping load or an element carried by the load.

The form of the invention, shown in FIG. 4, includes a bracket 55 which is attached by screws 56 to an overhead support 57. Bracket 55 carries a switch unit 58 which is positioned above and in spaced relation to piping P. Unit 58 contains an electric switch (not shown) which is connected to the solenoid by earlier-mentioned electric leads 42. Unit 58 is connected by a second pair of leads 59 to a source of electric energy supply 60. The switch is normally open and is adapted to be actuated into closed position by a vertically reciprocable push button element 61. A lever 62 is pivotally connected at one end to unit 58, as indicated at 63. This lever is normally biased in a counterclockwise direction about pivot 63 by gravity or by suitable spring means (not shown). A bracket 64 is affixed to piping P and is provided with a threaded, vertically adjustable actuating member 65. Member 65 and the free end of lever 62 are vertically aligned whereby predetermined upward movement of the piping causes member 65 to engage and move lever 62 in a clockwise direction about pivot 63. This, in turn, causes lever 62 to engage and move push button element 61 upwardly, thereby closing the switch. As a consequence, solenoid 41 is energized and valve 40 is operated to closed position.

The arrangement of apparatus shown in FIG. 1 contemplates supporting an overhead piping load P by means of spring support device S and hydraulic unit H which are positioned beneath the load.

The form of the invention shown in FIG. 5 contemplates a modified arrangement of apparatus whereby piping load P is suspended by and below hydraulic unit H and a spring support device S′ which is similar to earlier-described device S.

The apparatus illustrated in FIG. 5 includes a support, such as a building beam 66, and a bracket 67 which is welded to and depends from the beam. Spring support device S′ comprises a cylindrical housing 68 and a pair of plates 69 which are welded to the upper end of the housing and are pivotally connected to bracket 67, as indicated at 70. A second pair of plates 71, corresponding to plates 14, is welded to the low end of housing 68. It will be observed that the apparatus shown in FIG. 5 is similar to and inverted as compared to the construction shown in FIG. 1.

The apparatus of FIG. 1 has its parts so constructed and arranged that load-carrying means 17 and piston rod 30 are normally under compression. The corresponding parts of the apparatus of FIG. 5 are normally in tension.

From the foregoing, it is believed that the construction, operation, objects and advantages of our present invention will be readily comprehended by persons skilled in the art, without further description. It is to be clearly understood, however, that various changes in the construction described above and illustrated in the drawings may be made without departing from the scope of the invention, it being intended that all matter contained in the description or shown in the drawings shall be interpreted as illustrative only and not in a limiting sense.

We claim:

1. In support apparatus for a piping load or the like, supporting means comprising a spring support device and a hydraulic unit, said support device including a housing and a lever connected to the housing for movement about a first pivotal axis, said hydraulic unit including a cylinder for containing a supply of a substantially incompressible fluid, a piston reciprocable in the cylinder, a piston rod connected to the piston and extending through and beyond an end of the cylinder, a conduit establishing communication between opposite end portions of the interior of the cylinder, and a valve connected to the conduit for controlling fluid flow therethrough, said lever being connected to the piston rod for movement about a second pivotal axis, load-carrying means connected to the lever and adapted to be connected to the piping load, and means responsive to variations in a condition of the piping load for operating the valve.

2. Support apparatus according to claim 1 wherein the load-carrying means projects upwardly from the supporting means and the piping load is adapted to exert a compressive force on the load-carrying means and the piston rod.

3. Support apparatus according to claim 1 wherein the load-carrying means projects downwardly from the supporting means and the piping load is adapted to exert a tensile force on the load-carrying means and the piston rod.

4. Support apparatus according to claim 1 wherein said first and second pivotal axes are substantially parallel.

5. Support apparatus according to claim 1 wherein said second pivotal axis is normal to path of reciprocation of the piston.

6. Support apparatus according to claim 1 wherein said first and second pivotal axes are substantially parallel and wherein the path of reciprocation of the piston is normal to a plane which is common to said pivotal axes.

7. Support apparatus according to claim 6 wherein the load-carrying means is connected to the lever at a location intermediate said pivotal axes.

8. In support apparatus for a piping load or the like, supporting means comprising a spring support device and a hydraulic unit, said support device including a housing and a lever connected to the housing for movement about a first pivotal axis, said hydraulic unit including a cylinder for containing a supply of a substantially incompressible fluid, a piston reciprocable in the cylinder, a piston rod connected to the piston and extending through and beyond an end of the cylinder, a conduit establishing communication between opposite end portions of the interior of the cylinder, and a valve connected to the conduit for controlling fluid flow therethrough, said lever being connected to the piston rod for movement about a second pivotal axis, load-carrying means, spaced first and second coupling means secured to the load-carrying means, at least one of the coupling means comprising a universal joint, said first coupling means connecting the load-carrying means to the lever, said second coupling means being adapted to connect the load-carrying means to the piping load, and means responsive to variations in a condition of the piping load for operating the valve.

9. In support apparatus for a piping load or the like, supporting means comprising a spring support device and a hydraulic unit, said support device including a housing and a lever connected to the housing for movement about a first pivotal axis, said hydraulic unit including a cylinder for containing a supply of a substantially incompressible fluid, a piston reciprocable in the cylinder, a piston rod connected to the piston and extending through and beyond an end of the cylinder, a conduit establishing communication between opposite end portions of the interior of the cylinder, and a valve connected to the conduit for controlling fluid flow therethrough, said lever being connected to the piston rod for movement about a second pivotal axis, load-carrying means connected to the lever and adapted to be connected to the piping load, an electric circuit including a solenoid for operating the valve and an electric switch for opening and closing the circuit, and means responsive to variations in a condition of the load for actuating the switch whereby to operate the solenoid in a manner to effect corresponding operation of the valve.

10. In support apparatus for a piping load or the like, supporting means comprising a spring support device and a hydraulic unit, said support device including a housing and a lever connected to the housing for movement about a first pivotal axis, said hydraulic unit including a cylinder for containing a supply of a substantially incompressible fluid, a piston reciprocable in the cylinder, a piston rod connected to the piston and extending through an end of the cylinder, a conduit establishing communication between opposite end portions of the interior of the cylinder, and a valve connected to the conduit for controlling fluid flow therethrough, said lever being connected to the piston rod for movement about a second pivotal axis, load-carrying means connected to the lever and adapted to be connected to the piping load, an electric circuit including a solenoid for operating the valve and an electric switch for opening and closing the circuit, and means associated with the switch and adapted to be subjected to fluid pressure created in the piping load, said last-mentioned means being adapted to respond to variations in said fluid pressure to thereby actuate the switch whereby to operate the solenoid in a manner to effect corresponding operation of the valve.

11. In support apparatus for a piping load or the like, supporting means comprising a spring support device and a hydraulic unit, said support device including a housing and a lever connected to the housing for movement about a first pivotal axis, said hydraulic unit including a cylinder for containing a supply of a substantially incompressible fluid, a piston reciprocable in the cylinder, a piston rod connected to the piston and extending through an end of the cylinder, a conduit establishing communication between opposite end portions of the interior of the cylinder, and a valve connected to the conduit for controlling fluid flow therethrough, said lever being connected to the piston rod for movement about a second pivotal axis, load-carrying means connected to the lever and adapted to be connected to the piping load, an electric circuit including a solenoid for operating the valve and an electric switch for opening and closing the circuit, and means associated with the switch and adapted to be subjected to the temperature of fluid in the piping load, said last-mentioned means being adapted to respond to variations in said temperature to thereby actuate the switch whereby to operate the solenoid in a manner to effect corresponding operation of the valve.

12. In support apparatus for a piping load or the like, supporting means comprising a spring support device and a hydraulic unit, said support device including a housing and a lever connected to the housing for movement about a first pivotal axis, said hydraulic unit including a cylinder for containing a supply of a substantially incompressible fluid, a piston reciprocable in the cylinder, a piston rod connected to the piston and extending through an end of the cylinder, a conduit establishing communication between opposite end portions of the interior of the cylinder, and a valve connected to the conduit for controlling fluid flow therethrough, said lever being connected to the piston rod for movement about a second pivotal axis, load-carrying means connected to the lever and adapted to be connected to the piping load, an electric circuit including a solenoid for operating the valve and an electric switch for opening and closing the circuit, and means associated with the switch and adapted to be subjected to movement of at least a part of the piping load, said last-mentioned means being adapted to respond to variations in said movement of the piping load to thereby actuate the switch whereby to operate the solenoid in a manner to effect corresponding operation of the valve.

13. Support apparatus according to claim 12 wherein said first and second pivotal axes are substantially parallel.

14. Support apparatus according to claim 12 wherein said first and second pivotal axes are substantially parallel and wherein the path of reciprocation of the piston is normal to a plane which is common to said pivotal axes.

15. Support apparatus according to claim 14 wherein the load-carrying means is connected to the lever at a location intermediate the pivotal axes.

References Cited in the file of this patent

UNITED STATES PATENTS

| | | |
|---|---|---|
| 1,522,243 | Hughes | Jan. 6, 1925 |
| 2,028,491 | Barrett | Jan. 21, 1936 |
| 2,574,309 | Wood | Nov. 6, 1951 |
| 2,964,272 | Olson | Dec. 13, 1960 |
| 2,966,124 | Casey | Dec. 27, 1960 |

FOREIGN PATENTS

| | | |
|---|---|---|
| 263,466 | Great Britain | Dec. 30, 1926 |